United States Patent
Slattery

(10) Patent No.: US 6,668,417 B1
(45) Date of Patent: Dec. 30, 2003

(54) HANDLE SYSTEMS FOR HAND FLOATS

(76) Inventor: Anthony D. Slattery, 928 N. Grennan Pl., Camano Island, WA (US) 98292

(*) Notice: Subject to any disclaimer, the term of this patent is extended or adjusted under 35 U.S.C. 154(b) by 108 days.

(21) Appl. No.: 09/976,351

(22) Filed: Oct. 12, 2001

Related U.S. Application Data

(63) Continuation-in-part of application No. 09/528,408, filed on Mar. 17, 2000.

(51) Int. Cl.[7] .............................. B05C 17/10; G01C 9/00
(52) U.S. Cl. ........................................ 15/235.4; 33/334
(58) Field of Search ............................. 15/235.4, 235.5, 15/235.6, 235.8; 33/333, 334, 354, 379, 383, 451; D8/10

(56) References Cited

U.S. PATENT DOCUMENTS

| | | |
|---|---|---|
| 117,677 A | 8/1871 | Pfouts |
| 316,464 A | 4/1885 | Huther |
| 1,490,220 A | 4/1924 | Lawrence |
| 1,498,066 A | 6/1924 | Barth |
| 1,617,125 A | 8/1927 | Kuhar |
| 1,702,689 A | 2/1929 | Duemier |
| 2,076,836 A | 4/1937 | Goldblatt |
| 2,655,733 A | 10/1953 | Costa |
| 2,945,253 A | 7/1960 | Billings |
| 3,302,233 A | 2/1967 | Sebastiani |
| 3,664,032 A | 5/1972 | Tompkins |
| 5,046,387 A | 9/1991 | Levake |
| 6,178,586 B1 | 1/2001 | Jafarmadar |
| 6,505,408 B1 * | 1/2003 | Talamantez et al. .......... 33/334 |

* cited by examiner

*Primary Examiner*—Terrence R. Till
(74) *Attorney, Agent, or Firm*—Michael R. Schacht; Schacht Law Office, Inc.

(57) ABSTRACT

A hand float for forming a concrete slab. The hand float comprises a substantially rectangular float member, a handle member, first and second screw members that attach the handle member to the float member, and a leveling device attached to the handle member. he user of the hand float grasps the handle member to work the concrete slab before the slab is cured. The user of the hand float views the leveling device while working the concrete slab to ensure that the portion of the slab being worked is substantially flat and substantially at a desired level.

27 Claims, 13 Drawing Sheets

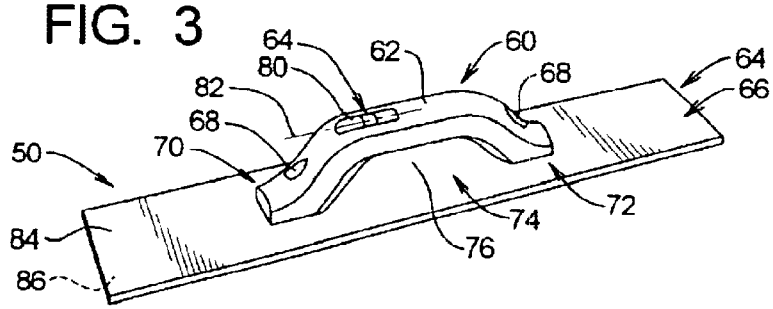
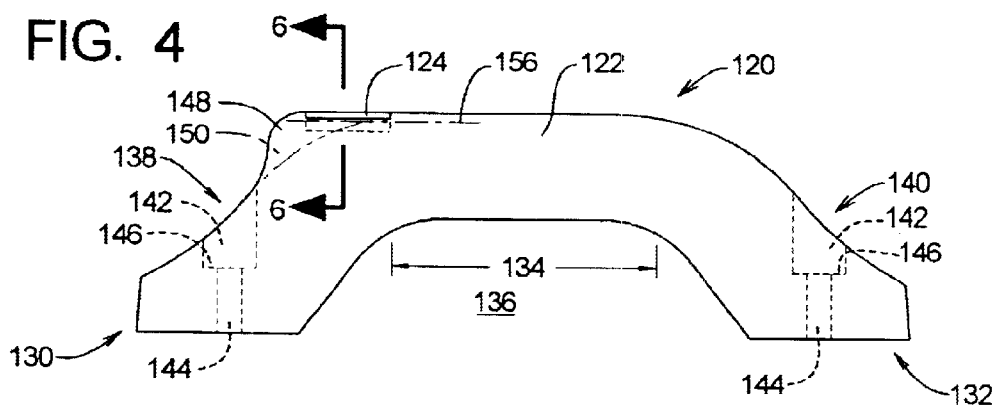
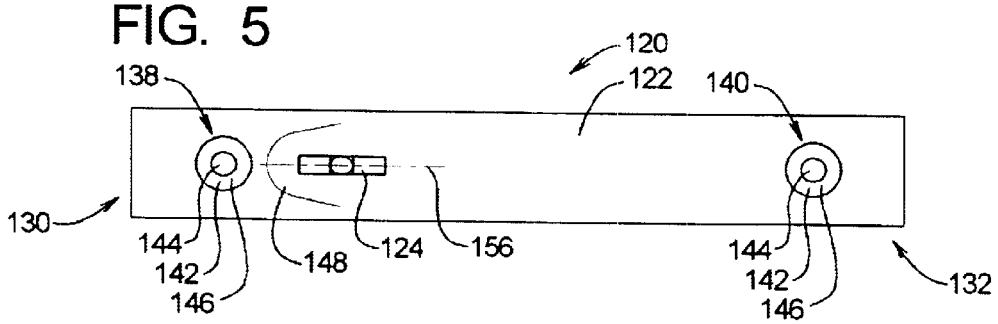
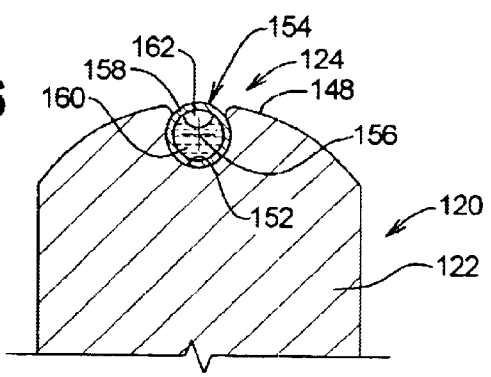

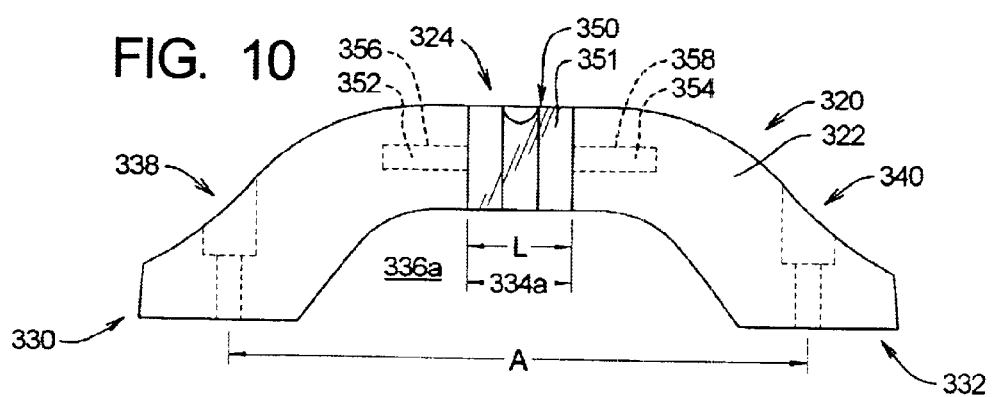
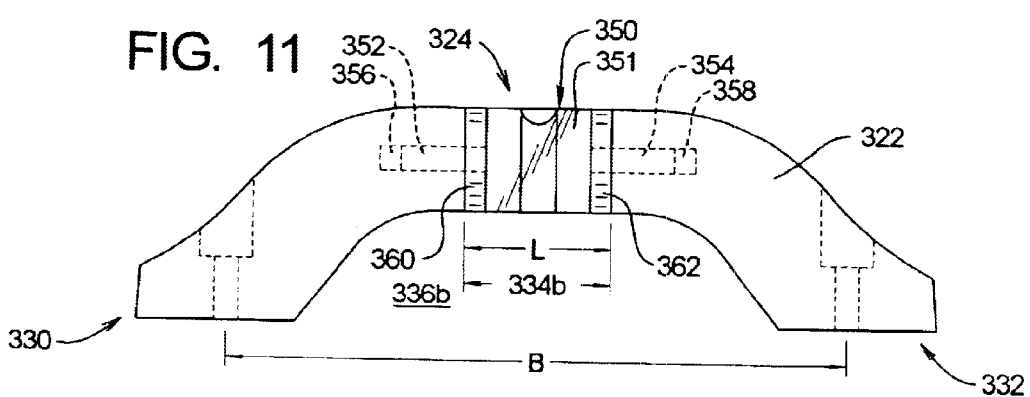
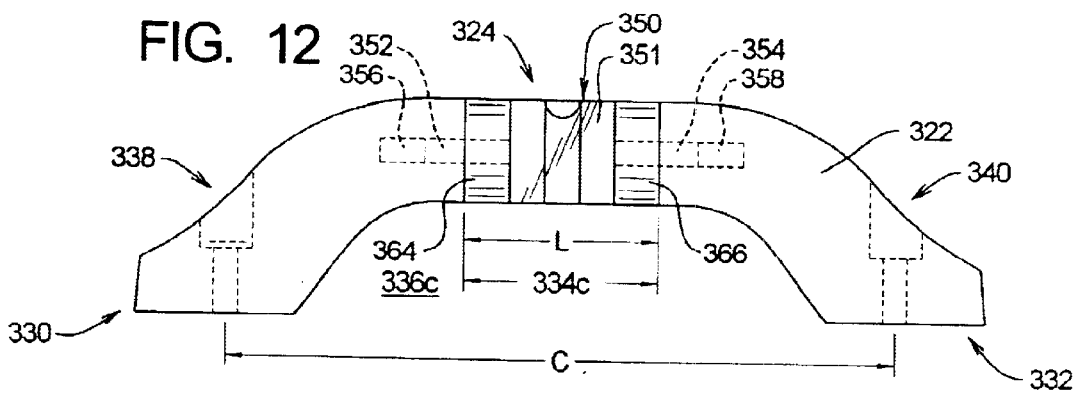

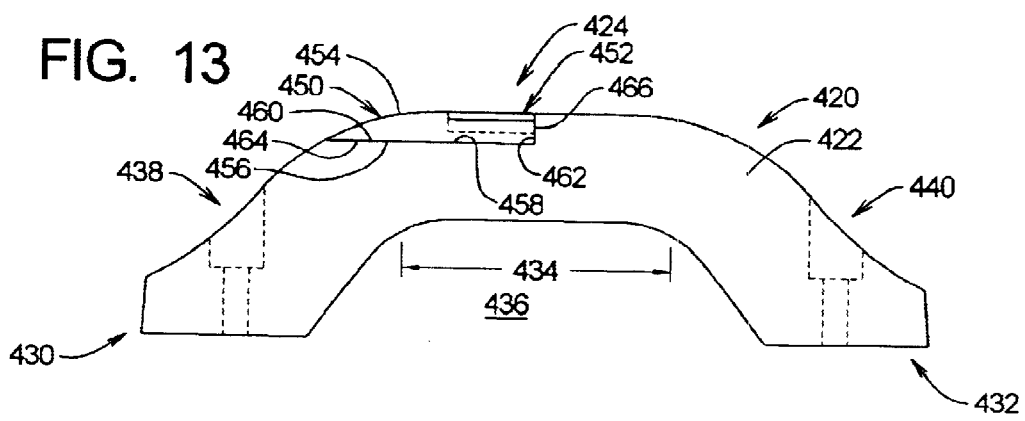
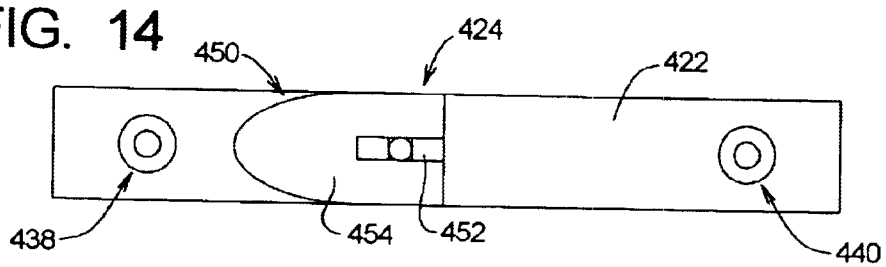
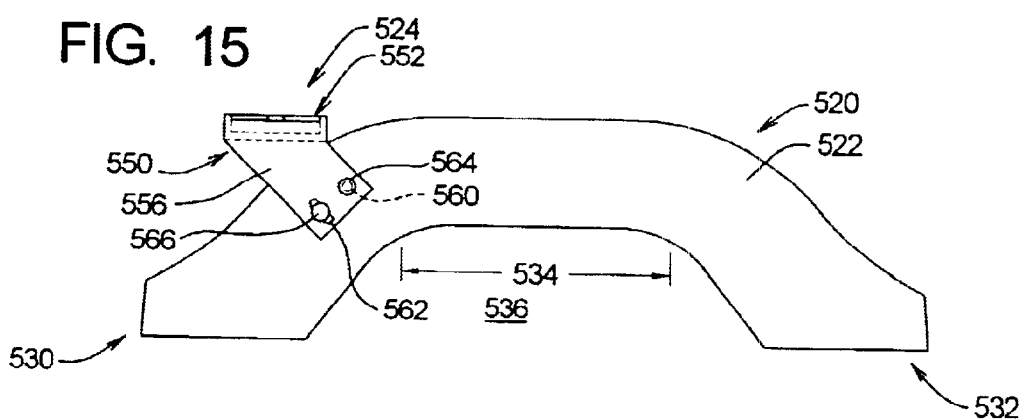
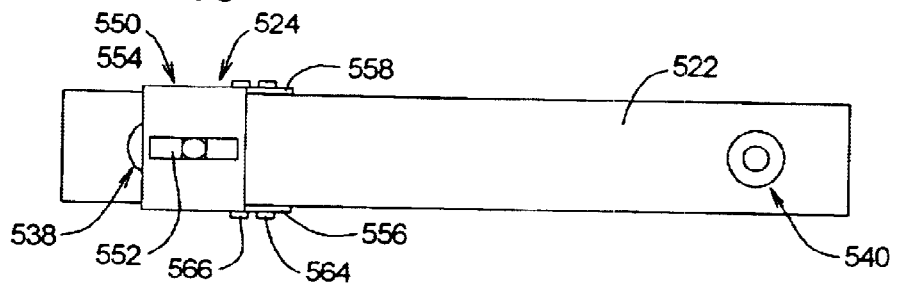

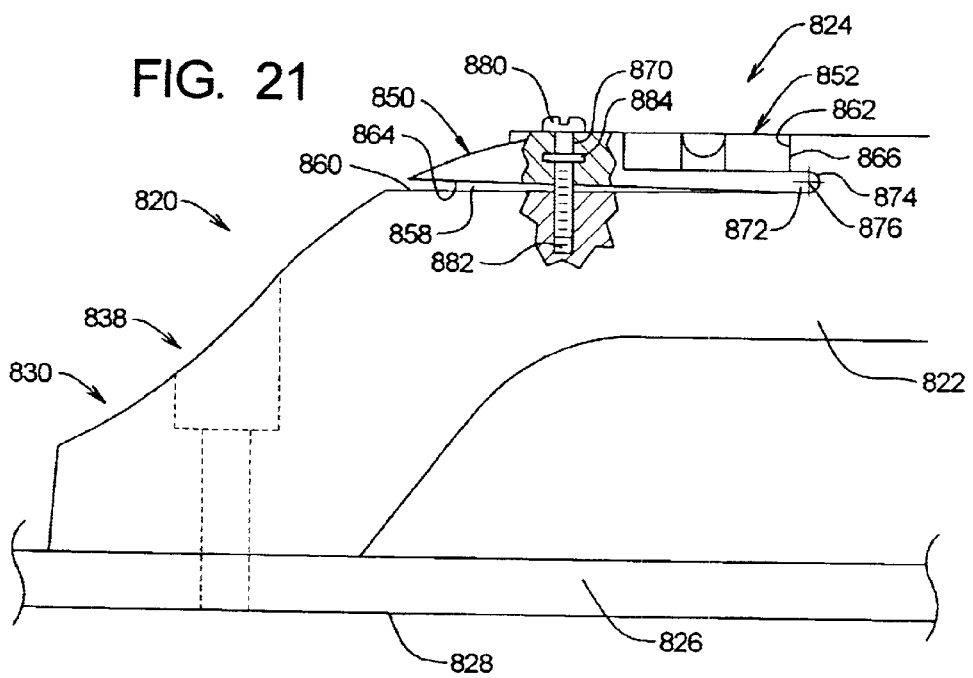

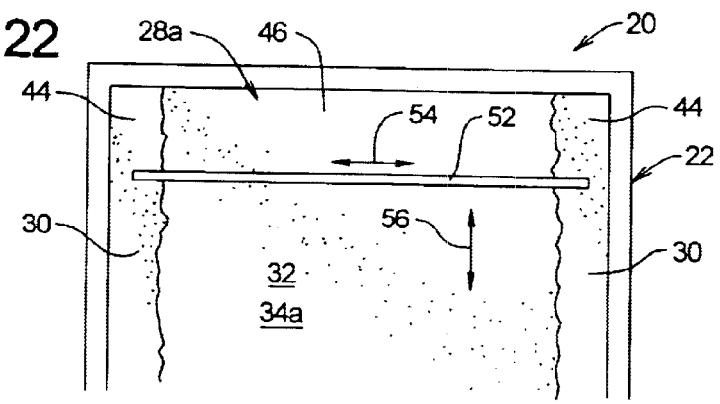
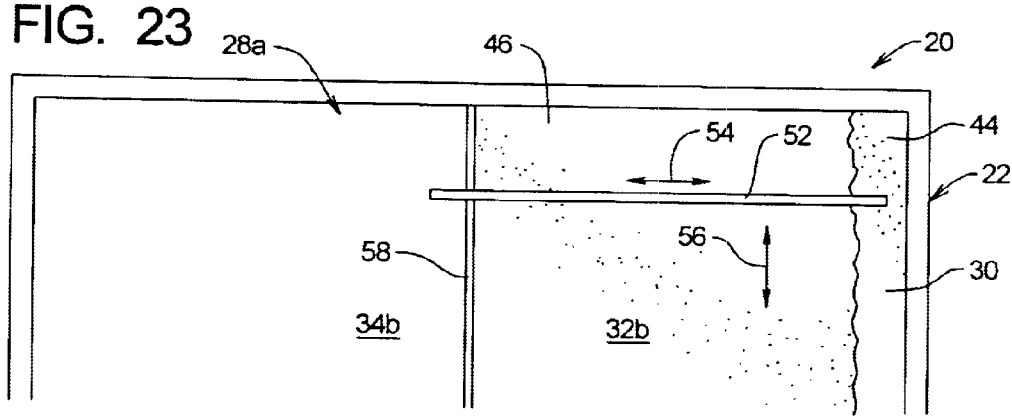

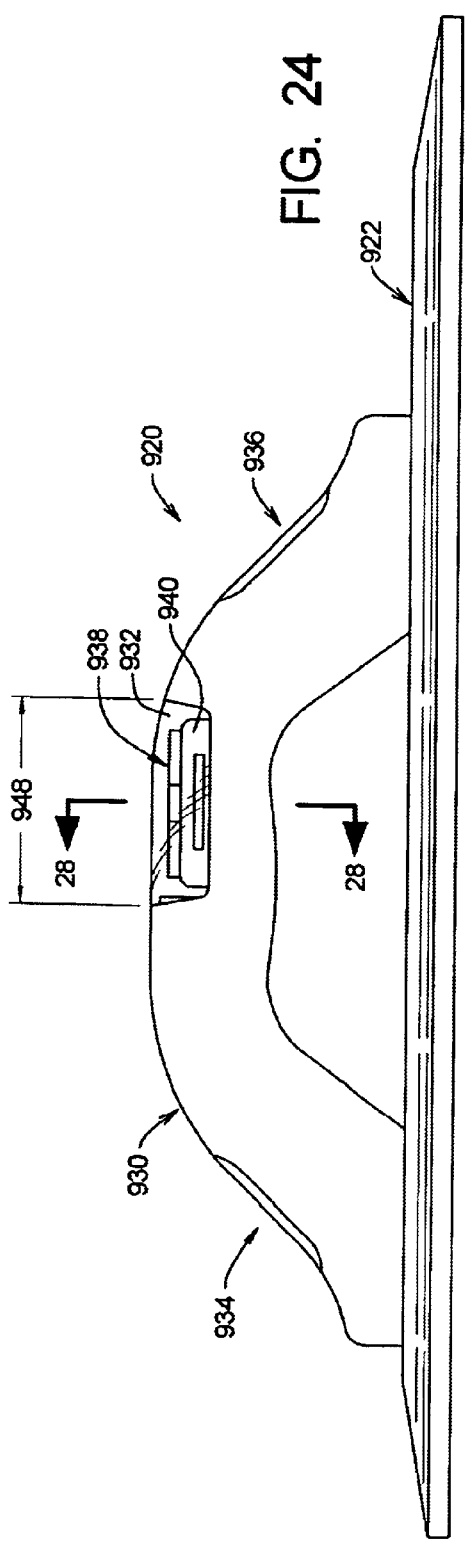
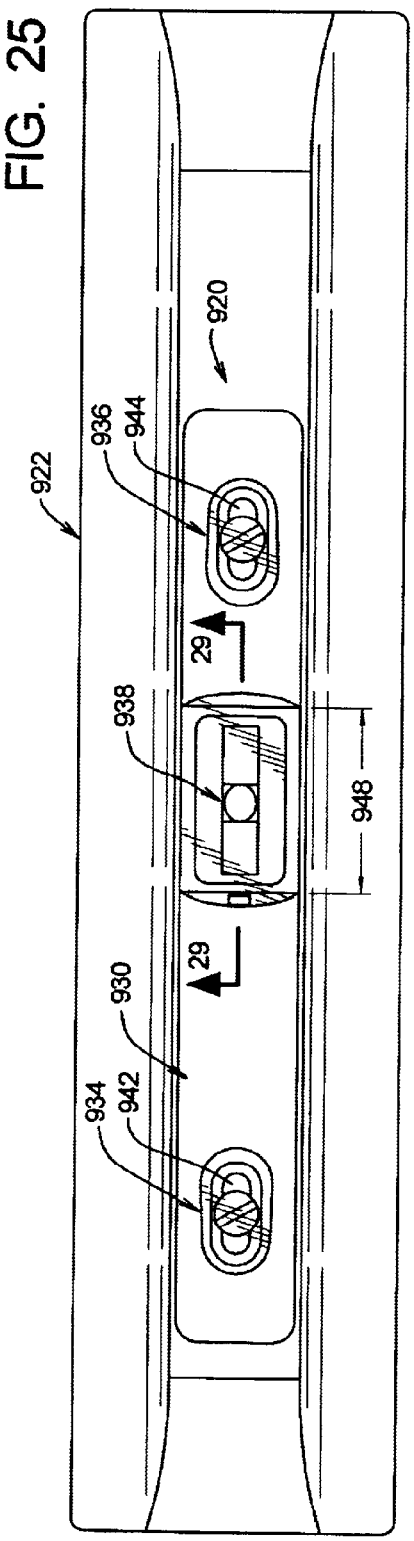

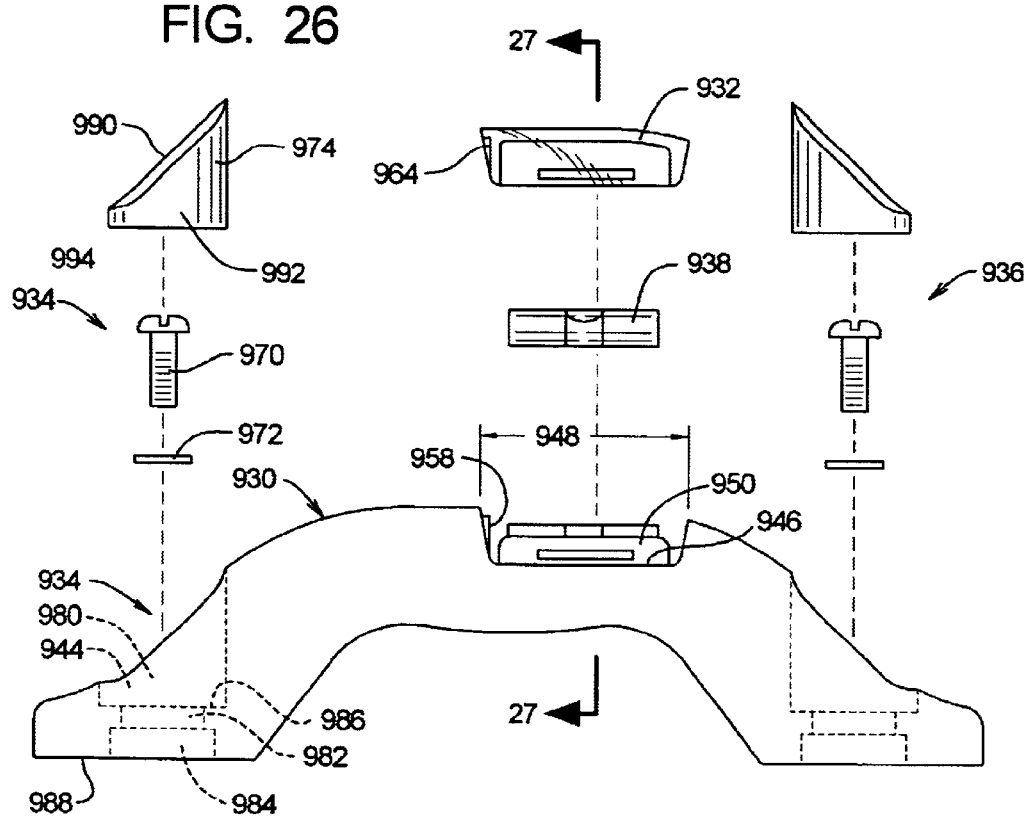

HANDLE SYSTEMS FOR HAND FLOATS

RELATED APPLICATIONS

This is a continuation-in-part of U.S. patent application Ser. No. 09/528,408, which was filed on Mar. 17, 2000.

TECHNICAL FIELD

The present invention relates to systems for and methods of pouring concrete slabs and, more specifically, to such tools and methods that increase the likelihood that the slab will be flat and at a predetermined vertical level.

BACKGROUND OF THE INVENTION

Buildings are often designed to incorporate at least one level having a floor that is on or below the grade of the ground around the building. Such floors are commonly fabricated of concrete that is poured on site; when poured, this type of concrete floor is commonly referred to as a slab.

A concrete slab must be worked on site to obtain a flat surface appropriate for use as a floor or which can be covered by a floor covering such as a carpet. To obtain a flat surface, an elongate member having a straight edge is moved back and forth over the surface of the wet concrete such that the straight edge forms a flat surface. Normally, the elongate member is a piece of wood referred to as a screed board.

While the use of a screed board can result in the formation of a concrete slab having a flat surface, the screed board does not necessarily yield a level surface. To obtain a surface that is both flat and level, the ends of the screed board must be supported at known vertical locations.

In practice, a foundation is initially formed of reinforced concrete to transfer the loads of the walls, upper floors, roof, and building contents to the ground. The foundation comprises a short vertical foundation wall portion that extends upwardly from a footing that is wider than the wall portion. A mark or chalk line is then formed on the foundation wall to define the level of the upper surface of the concrete slab. Concrete is then poured within a pour area defined by the foundation and worked with the screed board such that the upper surface thereof lies in the same horizontal plane as the chalk line on the foundation wall.

If the pour area defined by the foundation is sufficiently small, the screed board may extend across the pour area from one portion of the foundation wall to another portion thereof. In other cases, the screed board will not be able to extend completely across the pour area. In such cases, a horizontal support screed support bar is provided within the pour area to support one end of the screed board.

In either case, any end of the screed board adjacent to a foundation wall is supported by what is referred to as a shoulder. The shoulder is a narrow band of concrete that extends around the perimeter of the foundation.

In addition, a slab will often be poured around obstructions such as pipes, conduit, columns, and the like. The screed board cannot be used in these locations because of these obstructions.

Ideally, the shoulder and areas around obstructions are worked by hand using what is referred to as a hand float such that the shoulder is flat, level, and in the same vertical plane as the chalk line on the foundation wall or around the obstruction.

In practice, however, the use of a hand float to obtain a flat surface at the desired vertical level requires substantial skill. If the person using the hand float is not skilled, the edge of the shoulder closely adjacent to the foundation wall or obstruction may be at the same vertical level as the chalk line on the foundation wall but may slope upwards or downwards away from the foundation wall.

Conventionally, a carpenter's level is used to help ensure that the shoulder is flat and level with the chalk line, but the use of a carpenter's level is time consuming and only indicates that a narrow strip of the shoulder is flat and level with the chalk line.

If any portion of the shoulder is not flat and level with the chalk line, the working edge of the screed board will not be horizontal and within the vertical plane defined by the chalk line. Accordingly, the actual level of the upper surface of the concrete slab as formed by a mis-aligned screed board will deviate from the desired level of the upper surface of the concrete slab.

If the upper surface of the concrete slab deviates from the desired level, a number of problems may result. First, the resulting floor will not be flat and level. Second, the actual amount of concrete used will be greater than or less than the predicted amount. These and other problems create the need for improved tools, systems, and methods of pouring concrete slabs.

RELATED ART

A professional patentability search conducted on behalf of the applicant turned up the following U.S. patents.

| Inventor | U.S. Pat. No. | Title |
|---|---|---|
| Sebastiani | 3,302,233 | Mortar Dressing Device |
| R.O. Billings | 2,945,253 | Mortar Joint Simulator Tool |
| G. Kuhar | 1,617,125 | Plumb Trowel |
| L.R. Barth | 1,498,066 | Level Attachment |
| W.C. Lawrence | 1,490,220 | Bricklayer's Trowel |
| David Pfouts | 117,677 | Improvement in File-Handles |

All of the patents in the table set forth above incorporate a bubble or spirit level into the handle of a tool of some sort. The patents to Sebastiani, Billings, Kuhar, and Lawrence depict and describe masonry tools having a spirit or bubble level incorprated into a handle thereof. None of these tools relate to hand floats for working the shoulder of a concrete slab. In contrast, these tools are specialized tools for laying bricks and, in particular, to working mortar between bricks in a vertical brick wall. The problems faced when building a brick wall are significantly different from those of pouring concrete as described above. Accordingly, the Sebastiani, Billings, Kuhar, and Lawrence patents do not disclose, teach, or suggest improved tools and/or methods for pouring flat and level concrete slabs.

The Barth and Pfouts patents relate to a ditch digging tool and a file with a spirit or bubble level incorporated therein and thus are less relevant than the patents described above.

SUMMARY OF THE INVENTION

A hand float for forming a concrete slab. The hand float comprises a substantially rectangular float member, a handle member, first and second screw members that attach the handle member to the float member, and a leveling device attached to the handle member. he user of the hand float grasps the handle member to work the concrete slab before the slab is cured. The user of the hand float views the leveling device while working the concrete slab to ensure that the portion of the slab being worked is substantially flat and substantially at a desired level.

The present invention may also be embodied as a method of forming a concrete slab comprising the following steps. First, a foundation defining a pour area is formed. A mark is formed on the foundation defining a desired level of the concrete slab. A shoulder portion of the concrete slab is then poured. A hand float assembly having a handle member, a float member, and a leveling device is used to work the shoulder portion of the concrete slab while viewing the leveling device and the mark on the foundation such that an upper surface of the shoulder portion is substantially flat and substantially at the same vertical level as the desired level of the concrete slab. The main portion of the concrete slab is then poured within the pour area. A first end of a screed board is supported on the shoulder portion of the concrete slab, and the screed is moved to work the main portion of the concrete slab such that the main portion of the concrete slab is substantially flat and substantially at the same vertical level as the desired level of the concrete slab.

BRIEF DESCRIPTION OF THE DRAWINGS

FIG. 3 is a perspective view of a first embodiment of a hand float constructed in accordance with, and embodying, the principles of the present invention;

FIG. 4 is a side elevation view of a handle assembly of a second embodiment of a hand float constructed in accordance with, and embodying, the principles of the present invention;

FIG. 5 is a top plan view of the handle assembly of the hand float of the second embodiment as shown in FIG. 4;

FIG. 6 is a section view of the handle assembly of the hand float of the second embodiment taken along lines 6—6 in FIG. 4;

FIGS. 10–12 are side elevation views of a fourth embodiment of a hand float constructed in accordance with, and embodying, the principles of the present invention;

FIG. 13 is a side elevation view of a handle assembly of a fifth embodiment of a hand float constructed in accordance with, and embodying, the principles of the present invention;

FIG. 14 is a top plan view of the handle assembly of the hand float of the fourth embodiment shown in FIG. 13;

FIG. 15 is a side elevation view of a handle assembly of a fifth embodiment of a hand float constructed in accordance with, and embodying, the principles of the present invention;

FIG. 16 is a top plan view of the handle assembly of the hand float of the fifth embodiment shown in FIG. 15;

FIG. 21 is a side elevation view of a portion of a seventh embodiment of a hand float constructed in accordance with, and embodying, the principles of the present invention;

FIGS. 22 and 23 are top plan views of exemplary concrete slab systems formed using the systems and methods of the present invention;

FIGS. 24 and 25 are side elevation and top plan views, respectively, of yet another exemplary hand float assembly of the present invention;

FIG. 26 is a side elevation exploded view of the handle assembly of the hand float assembly of FIGS. 24 and 25;

DETAILED DESCRIPTION OF THE INVENTION

Figure 1A:
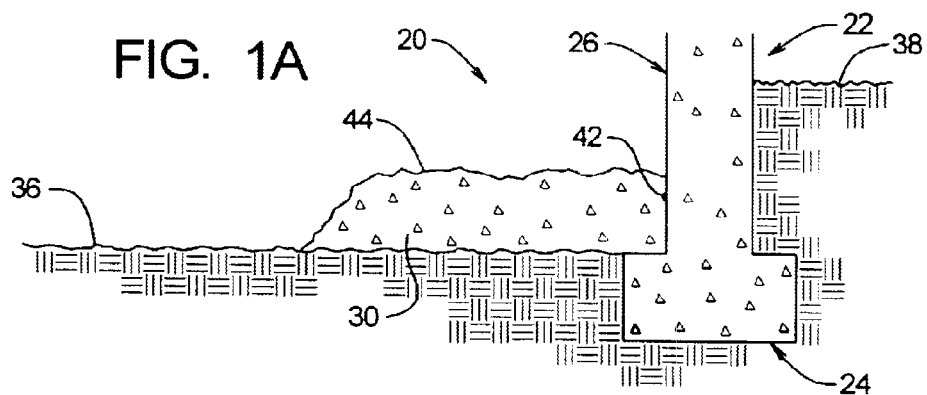
FIGS. 1A–D are side elevation views depicting systems and methods for forming concrete slabs according to the principles of the present invention.

The present invention may be embodied as a method of forming a concrete slab system or a hand float to be used in forming a concrete slab system. The method of use will initially be described below, after which will be presented a discussion of a number of embodiments of hand floats embodying the principles of the present invention.

I. Method of Use

Referring now to the drawing, depicted in FIGS. 1A–D is a method of creating a concrete slab system 20 embodying the principles of the present invention. The system depicted in FIGS. 1A–D illustrate the present invention as forming a level and flat surface adjacent to a foundation wall, but the principles of the present invention may be applied in other contexts such as forming a flat, level slab surface around obstructions such as pipes, conduits, columns, and the like around which the slab is poured.

The exemplary concrete slab system 20 itself is conventional. The slab system comprises a foundation 22 having a footing portion 24 and a foundation wall portion 26. Normally, the foundation 22 is poured and allowed to set before completing the formation of the slab system 20.

Figure 1B:
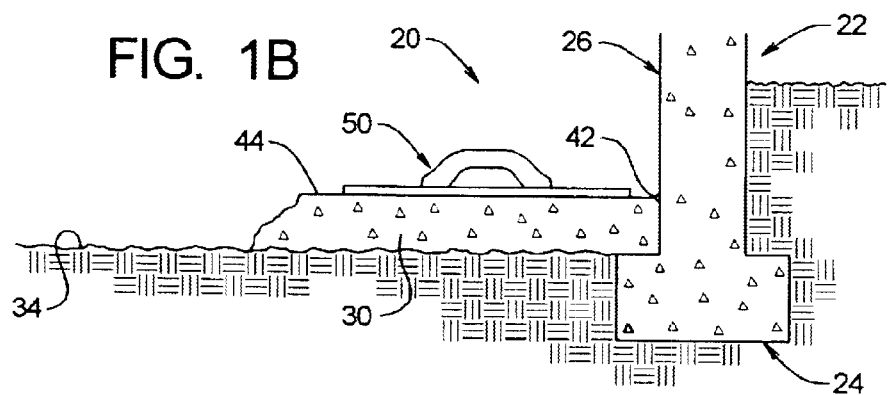
Figure 1C:
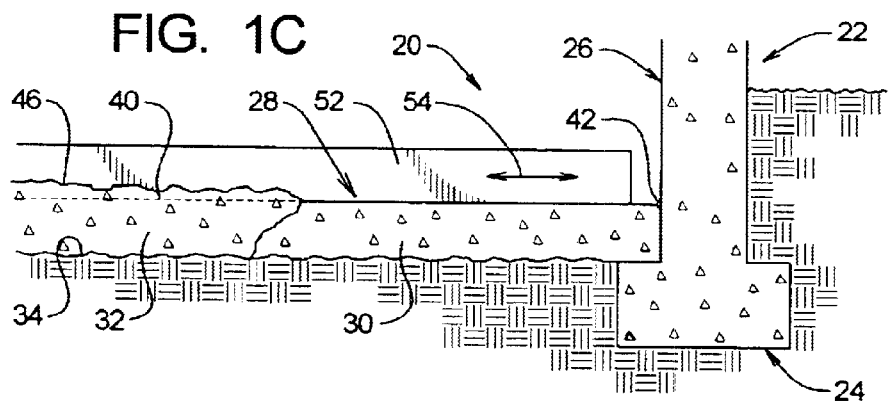
Figure 1D:
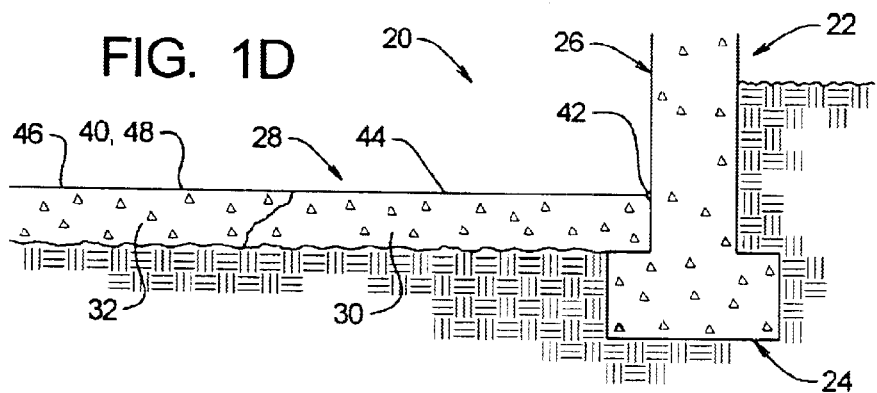

Referring for a moment to FIG. 1D, a portion of a finished slab 28 is shown. As shown in FIGS. 22 and 23, the slab 28 comprises a shoulder portion 30 and a main portion 32. The slab 28 can vary in size depending upon the dimensions of a pour area 34 defined by the foundation 22. In FIG. 22, the pour area 34a is relatively small and defines a slab 32a. The pour area 34b in FIG. 23 is relatively large and defines a slab 32b that is larger than the slab 32a. Pouring the slab 32b requires an additional step as will be described in detail below.

As is conventional, an inner portion 36 of the ground is graded to approximately the same level as the top of the footing 24. An exemplary outer portion 38 of the ground is backfilled against the foundation wall 26 at a level higher than the inner portion 36. The relative vertical levels of the inner and outer portions 36 and 38 of the ground are defined by site characteristics and building design.

Referring back to FIGS. 1A and 1C, a desired level 40 of the slab 32 is first determined and a chalk line 42 or other mark is formed on the foundation wall 36 in a horizontal plane defined by the desired level 40. As shown in FIG. 1D, a surface 44 of the shoulder 30 and a surface 46 of the main portion 32 of the slab 28 define a slab surface 48 that should be at the desired level 40.

Next, the shoulder portion 30 of the slab 28 is poured along at least a portion of the perimeter of foundation 22 within the pour area 34. When first poured, the shoulder surface 44 is not flat and only generally relates to desired level 40.

As shown in FIG. 1B, the shoulder portion 30 is thus next worked with a hand float 50 such that the surface 44 thereof corresponds to the desired level 40. As will be described in detail below, the hand float 50 contains leveling means, and the user of the hand float continuously monitors these leveling means while working the shoulder portion 30 to ensure that the shoulder surface 44 is substantially flat and is substantially level with the chalk line 42. This process results in a shoulder surface 44 that is substantially coplanar with a horizontal plane extending through the desired level 42.

Once the shoulder portion 30 has been worked as described above, the main portion 32 of the slab 28 is poured. Again, the surface 46 of the main portion 32 initially is not flat and only generally relates to the desired level 40.

A screed board 52 rather than the hand float 50 is used to work the main portion 32 such that the surface 46 thereof is substantially flat and substantially coplanar with a horizontal plane extending through the desired level 40.

Referring now again to FIG. 22, for the relatively small slab 28a depicted therein, the screed board 52 extends across the slab 28a from one shoulder portion 30 to another shoulder portion 30. The screed board 52, while supported by the opposing shoulder portions 30, is moved back and forth along its longitudinal axis as shown by arrow 54 (FIGS. 1C and 22) and slowly moved in a transverse direction along arrow 56. The screed board 52 thus works the main portion of the slab 32 such that the surface 46 thereof is as flat as the bottom edge of the screed board 52.

In FIG. 23, the slab 28b is too large for a single screed board 52 to extend entirely across the slab 28b. In this case, a support rod 58 is arranged approximately in the middle of the slab 28b to support one end of the screed board 52. The support rod 58 is arranged such that its upper edge lies in a horizontal plane extending through the desired level 40.

In either case, the formation of the shoulder portion 30 is critical to the formation of a slab having an upper surface that is flat and lies within a horizontal plane defined by the desired level.

Figure 2A:
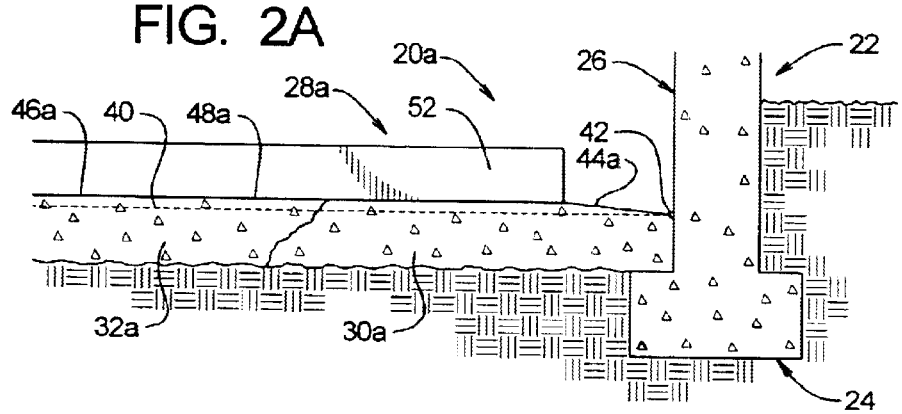
FIGS. 2A–B are side elevation views depicting prior art systems and methods for forming concrete slabs in which the slabs are not flat and/or level.
Figure 2B:
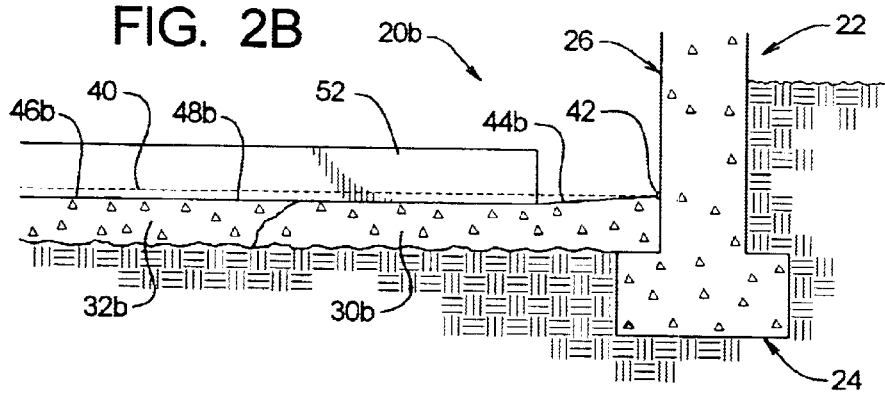

Slab systems 20a and 20b depicted in FIGS. 2A and 2B define upper surfaces 48a and 48b that are not flat and which are not level with a horizontal plane extending through the desired level 40. The reason for this is that the shoulder portions 30a and 30b of these systems 20a and 20b are not level with the desired level 40.

The shoulder portion 30a has been worked such that it slopes upwardly away from the foundation 22. Accordingly, the upper surface 48a of the slab 28a is convex, is not flat, and requires more concrete than planned for.

The shoulder portion 30b has been worked such that it slopes downwardly away from the foundation 22. Accordingly, the upper surface 48b thereof is concave and the slab 28b is not as thick as designed.

The hand float 50 having an integral leveling device, when used properly, can reduce the likelihood that the surface of a concrete slab is not at its desired level.

II. First Embodiment

Referring now to FIG. 3, the hand float 50 depicted therein will be discussed in further detail. The hand float 50 comprises a handle assembly 60 comprising a float handle 62 and a leveling device 64, a float plate 66, and mounting screws 68. While the handle assembly 60 and float plate 66 can be purchased as a unit, handle assemblies and float plates may be purchased separately and assembly by the end user. The float plate 66 and mounting screws 68 are generally conventional and will be described herein only to the extent necessary for a complete understanding of the present invention.

The handle assembly 60 is unique to the hand float 50 of the present invention. The leveling device 64 is attached to the float handle 62 such that the user can check whether a surface being worked by the hand float 50 is level.

In particular, the float handle 62 comprises first and second end portions 70 and 72 and a center portion 74. The end portions 70 and 72 extend at an angle to the center portion 74 such that the handle 62 defines a notch portion 76 through which the user's fingers are inserted to grip the handle 62.

The exemplary leveling device 64 is a conventional bubble or spirit level 80 that defines a level axis 82 and indicates when the level axis 82 is horizontal.

The float plate 66 is sometimes referred to as a "mag plate" because it is made out of a hard material such as magnesium that is resistant to wear when working wet concrete. The float plate 66 defines an upper surface 84 and a lower or working surface 86 that is substantially planar. The lower surface 86 is brought into contact with the concrete during normal use.

The bubble level 80 is rigidly attached to the handle 62. The handle 62 is in turn rigidly attached to the float plate 66 using the mounting screws 68. When the hand float 50 is properly assembled, the level axis 82 defined by the bubble level 80 is parallel to a plane defined by the lower surface 86 of the float plate 66. Accordingly, the bubble level 80 will indicate whether a given surface is level when the hand float 50 is allowed to rest on the given surface with the lower surface 86 of the float plate 66 in contact with the given surface.

Figure 9A:
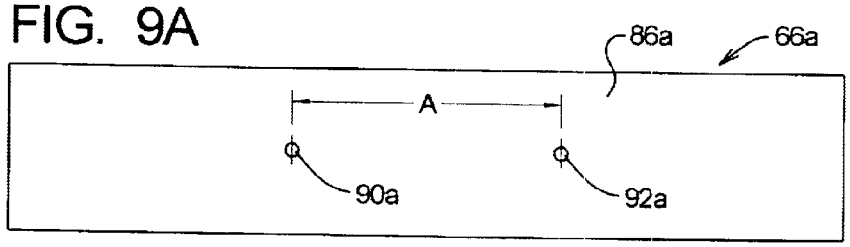
FIGS. 9A–B are top plan views depicting hole patterns in exemplary magnesium plates used in conventional hand floats.
Figure 9B:
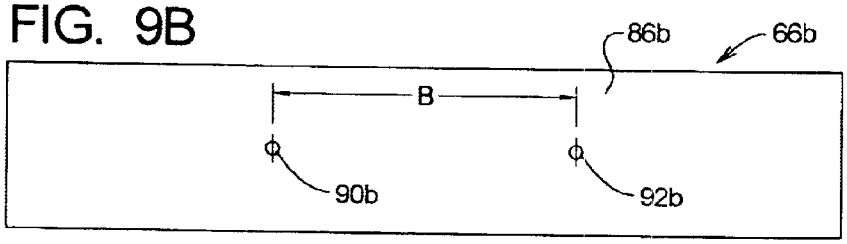
Figure 9C:
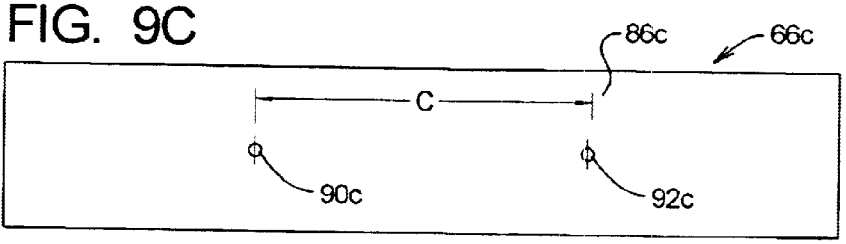

Conventional float plates are similar in overall dimensions but can vary somewhat in the formation of the holes that receive the mounting screws 68. In particular, exemplary float plates 66a, 66b, and 66c are shown in FIGS. 9A–C. First and second mounting holes 90a–c and 92a–c formed in the upper surfaces 86a–c of these plates 66a–c are spaced from each other by plate hole distances A, B, and C, respectively. Separate handle assemblies may be manufactured for each type of float plate, or, as described in detail below, a single handle assembly may be created in which the spacing between the handle holes in the handle assembly can be varied to accommodate different plate hole distances.

III. Second Embodiment

Referring now to FIGS. 4–6, a handle assembly 120 of a second embodiment of the hand float 50 will be described. The handle assembly 120 comprises a float handle 122 and a leveling device 124.

The float handle 122 defines first and second end portions 130 and 132 and a center portion 134. The end portions 130 and 132 extend at an angle to the center portion 134 such that the handle 120 defines a notch area 136 through which the user's fingers are inserted to grip the handle 120.

First and second handle holes 138 and 140 are formed in the end portions 130 and 132. Each of these handle holes 138 and 140 comprise an upper portion 142 and a lower portion 144. The upper portion 142 has a larger cross-sectional area than the lower portion 144 such that a transition surface 146 is formed between the two hole portions 142 and 144.

A level projection 148 is formed on the float handle 122 above the first handle end portion 130 and slightly in front of the handle center portion 134. A broken line 150 depicts the contour of a prior art handle member and thus illustrates the extent of the level projection 148.

A level groove 152 is formed in the level projection 148. The level groove 152 is sized and dimensioned to snugly receive a bubble or spirit level 154 that forms the leveling device 124. In addition, the level groove 152 is aligned with the bottom or working surface of the float plate to which the handle assembly 120 is attached. Accordingly, when the bubble level 154 is mounted within the level groove 152, the level axis 156 is parallel to the working surface of the float plate.

FIG. 6 further depicts details of the bubble level 154. The level 154 comprises a clear cylinder 158 that is closed at both ends. The cylinder 158 contains a liquid 160 and a small gas bubble 162. When the gas bubble 162 is aligned with markings on the cylinder 158, the axis 156 of the level 154 lies within a horizontal plane.

IV. Third Embodiment

Figure 7:
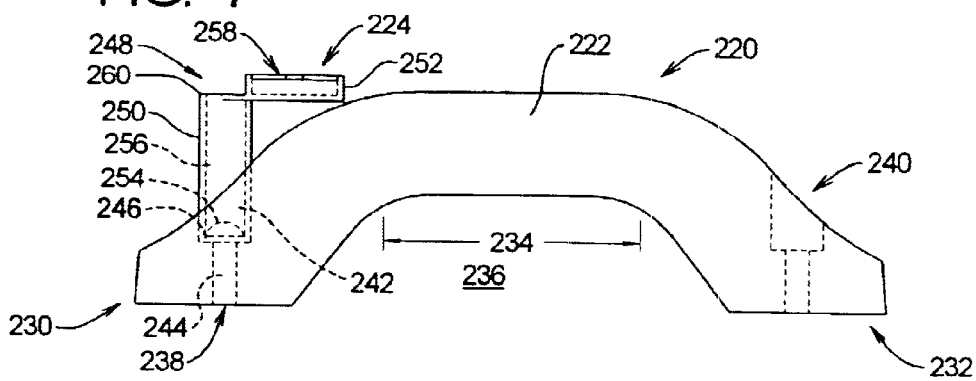
FIG. 7 is a side elevation view of a handle assembly of a third embodiment of a hand float constructed in accordance with, and embodying, the principles of the present invention.
Figure 8:
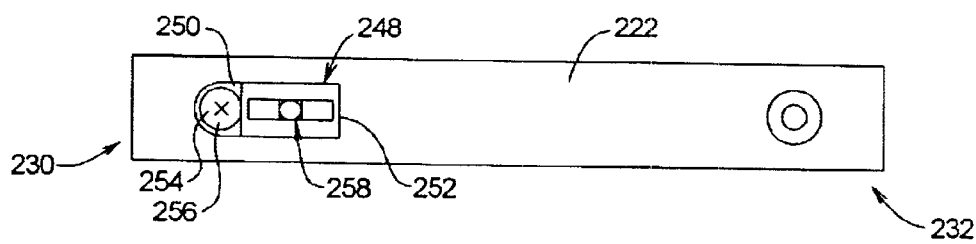
FIG. 8 is a top plan view of the handle assembly of the hand float of the third embodiment as shown in FIG. 7.

Referring now to FIGS. 7 and 8, a handle assembly 220 of a third embodiment of the hand float 50 will now be described. The handle assembly 220 comprises a float handle 222 and a leveling device 224.

The float handle 222 defines first and second end portions 230 and 232 and a center portion 234. The end portions 230 and 232 extend at an angle to the center portion 234 such that the handle assembly 220 defines a notch area 236 through which the user's fingers are inserted to grip the handle assembly 220.

First and second handle holes 238 and 240 are formed in the end portions 230 and 232. Each of these handle holes 238 and 240 comprise an upper portion 242 and a lower portion 244. The upper portion 242 has a larger cross-sectional area than the lower portion 244 such that a transition surface 246 is formed between the two hole portions 242 and 244.

A level bracket 248 comprising a vertical portion 250 and a horizontal portion 252 is attached to the handle 222 by a mounting screw 254. The mounting screw 254 is inserted into a screw chamber 256 defined by the vertical portion 250 of the bracket 248 and threaded into an appropriate plate hole in the plate to which the handle assembly 220 is to be attached. A bubble level 258 is mounted within the horizontal portion 252 of the bracket 248.

When threaded into an appropriate plate hole, the head of the mounting screw 254 clamps a portion of the bracket 248 against the intermediate surface 246 defined by the handle hole 238 to securely attach the bracket 248 onto the float handle 222. In this respect, the vertical portion 250 should be sized and dimensioned to fit snugly within the upper portion 242 of the handle hole 238 such that the axis of the level 258 is perpendicular to the longitudinal axis of the mounting screw 254. The axis of the bubble level 258 will thus be substantially parallel to the working surface of the float plate to which the handle assembly 220 is attached.

The exemplary bracket 250 is preferably a single injection molded part with the vertical and horizontal portions 250 and 252 arranged at right angles to each other. However, the bracket 250 may be comprised of separate vertical and horizontal pieces and connected at a hinge point that could be located as shown at 260 in FIG. 7. In this case, the angle between the vertical and horizontal portions could be adjusted to ensure that the axis of the bubble level 258 is parallel to the working surface of the float plate.

V. Fourth Embodiment

Referring now to FIGS. 10–12, a handle assembly 320 of a fourth embodiment of the hand float 50 will now be described. The handle assembly 320 comprises a float handle 322 and a leveling device 324. The handle assembly 320 incorporates a large, easily visible leveling device 324 and is adaptable to fit the different float plate distances A, B, and C described above with reference to FIGS. 9A–C.

The float handle 322 defines first and second end portions 330 and 332 and a center portion 334. The end portions 330 and 332 extend at an angle to the center portion 334 such that the handle assembly 320 defines a notch area 336 through which the user's fingers are inserted to grip the handle assembly 320. First and second handle holes 338 and 340 are formed in the end portions 330 and 332.

The leveling device 324 comprises a bubble or spirit level 350 comprising a clear cylindrical case 351 and closed ends from which level rods 352 and 354 extend. The exemplary level rods 352 and 354 are aligned with each other.

The end portions 330 and 332 of the exemplary float handle 322 are separate pieces in which rod holes 356 and 358 are bored. The rod holes are sized and dimensioned to receive the level rods 352 and 354, respectively.

When the handle assembly 320 is properly assembled, the handle holes 338 and 340 are aligned and the bubble level 350 defines the central portion 334 of the handle assembly 320, with the end portions 330 and 332 of the handle assembly 320 straddling the notch area 336. When mounting screws are inserted through the handle holes 338 and 340 and threaded into the plate holes formed in the float plate to which the handle assembly 320 is to be attached, the handle assembly will be held together as shown in FIG. 10.

The handle assembly as shown in FIG. 10 thus employs a large, easily visible bubble level 350 that will facilitate viewing by the user. The cross-sectional area of the bubble level 350 should match the cross-sectional area of the end portions 330 and 332 at the junctures between the bubble level 350 and end portions 330 and 332 to prevent a smooth surface to the user.

The handle assembly 320 may accommodate any of the plate hole distances A, B, or C described above simply be extending the length of the bubble level 350.

Alternatively, as shown in FIG. 10 an effective length L of the handle central portion 334 may be set such that the distance between the handle holes 338 and 340 equals the distance A between the plate holes of the float plate 66a of FIG. 9A. In this case, one or more spacing members, such as exemplary first and second spacing members 360 and 362 (FIG. 11) or third and fourth spacing members 364 and 366 (FIG. 12), may be arranged on either side of the bubble level 350 between the between the bubble level 350 and the end portions 330 and 332 of the handle assembly 320. The spacing members increase, as necessary, the effective length L of the central portion 334 to accommodate different plate distances B and C as shown. The level rods 352 and 354 should be of sufficient length to extend into the rod holes 356 and 358 even if spacing members are employed.

VI. Fifth Embodiment

Referring now to FIGS. 13 and 14, a handle assembly 420 of a fifth embodiment of the hand float 50 will now be described. The handle assembly 420 comprises a float handle 422 and a leveling device 424. The handle assembly 420 is designed such that the float handle 422 may be made primarily of a conventional material such as wood.

The float handle 422 defines first and second end portions 430 and 432 and a center portion 434. The end portions 430 and 432 extend at an angle to the center portion 434 such that the handle assembly 420 defines a notch area 436 through which the user's fingers are inserted to grip the handle assembly 420. First and second handle holes 438 and 440 are formed in the end portions 430 and 432.

The leveling device 424 comprises level frame 450 and a bubble or spirit level 452. The level frame 450 has an exposed surface 454 and a hidden surface 456. The exposed surface 454 is designed to form a smooth and continuous surface with the surrounding surface of the float handle 422. The hidden surface 456 is designed to be snugly received by a level notch 458 formed in the float handle 422. The level notch 458 is partly formed in the first end portion 430 and partly in the center portion 434 of the float handle 422.

In particular, the notch 458 is defined by a horizontal planar surface 460 and a vertical planar surface 462. A first planar surface 464 on the level frame 450 matches the surface area of the horizontal planar surface, while a second planar surface 466 matches the surface area of the vertical planar surface. Adhesive or fasteners such as screws or nails may be employed to affix the level frame 450 to the float handle 422.

The level frame 450 is preferably an injection molded plastic part having a notch or groove formed therein for receiving the bubble level 424; a snap fit or the like may be used to secure the bubble level 424 to the level frame 450.

VII. Sixth Embodiment

Referring now to FIGS. 15 and 16, a handle assembly 520 of a sixth embodiment of the hand float 50 will now be described. The handle assembly 520 comprises a float handle 522 and a leveling device 524. The handle assembly 520 is designed as an after-market add-on to a float handle 522 made primarily of a conventional material such as wood, plastic, or natural or synthetic rubber.

The float handle 522 defines first and second end portions 530 and 532 and a center portion 534. The end portions 530 and 532 extend at an angle to the center portion 534 such that the handle assembly 520 defines a notch area 536 through which the user's fingers are inserted to grip the handle assembly 520. First and second handle holes 538 and 540 are formed in the end portions 530 and 532.

The leveling device 524 comprises level frame 550 and a bubble or spirit level 552. The level frame 550 comprises a level plate 554 and first and second mounting flanges 556 and 558. The mounting flanges 556 and 558 extend from the level plate 554 such that they straddle the first portion 530 of the float handle 522. The level plate has a groove or slot formed therein that snugly and securely receives the bubble level 552.

Formed in each of the mounting flanges 556 and 558 are first and second flange openings 560 and 562 through which flange screws 564 and 566 extend. The flange screws 564 and 566 are further threaded into the float handle 522 to inhibit relative movement between the level frame 554 (and thus the bubble level 552) and the float handle 422 (and thus the float plate to which the handle assembly 520 is attached).

As described above in the other handle assembly embodiments, the axis of the bubble level 552 should be parallel to the lower surface of the float plate to which the handle assembly 520 is attached. Accordingly, care should be taken when mounting the level frame 550 onto the float handle 522. In particular, the float plate to which the handle assembly 520 is attached should be placed on a level surface and the screws tightened only when the bubble level 552 indicates that its axis is level.

To assist in this calibration process, the first flange opening 560 may be formed as a circular hole having a diameter slightly larger than the diameter of the threaded portion of the flange screw 564. The second flange opening 562 is a arcuate slot having a thickness slightly larger than the diameter of the threaded portion of the flange screw 566 and a radius of curvature defined by the distance of the slot from the first flange opening 560. This allows the first flange screw 564 and the second flange screw 566 to be almost tightened, at which point the level plate 554 is rotated until the bubble level 552 indicates that it is level, after which the screws 564 and 566 are fully tightened.

VIII. Seventh Embodiment

Figure 17:
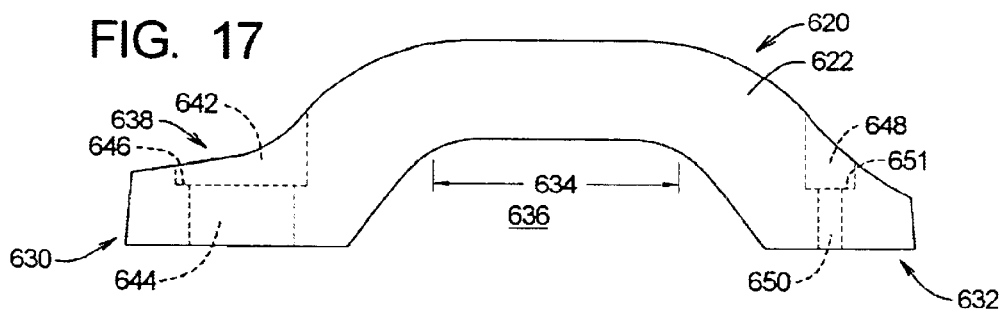
FIG. 17 is a side elevation view of a handle assembly of a sixth embodiment of a hand float constructed in accordance with, and embodying, the principles of the present invention.
Figure 18:
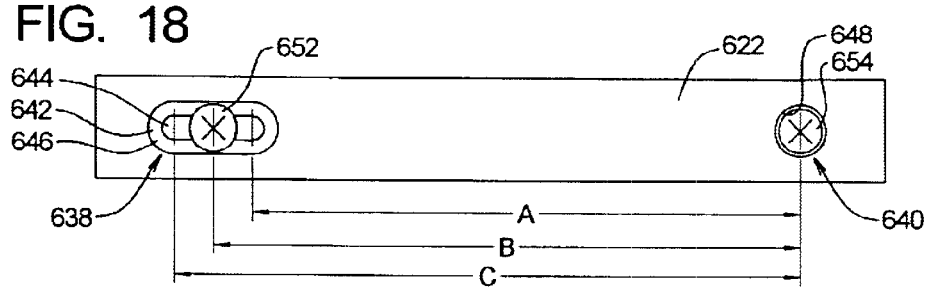
FIG. 18 is a top plan view of the handle assembly of the hand float of the sixth embodiment shown in FIG. 17.

Referring now to FIGS. 17 and 18, a handle assembly 620 of a seventh embodiment of the hand float 50 will now be described. As with all of the handle assemblies 60, 120, 220, 320, 420, and 560 described above, the handle assembly 520 comprises a float handle 522 and a leveling device (not shown). The leveling device of any of the previously discussed handle assemblies may be used with the handle assembly 620. The handle assembly 520 is designed as an after-market add-on that fits any of the float plates 66a, 66b, and 66c described above with reference to FIGS.

The float handle 622 defines first and second end portions 630 and 632 and a center portion 634. The end portions 630 and 632 extend at an angle to the center portion 634 such that the handle assembly 620 defines a notch area 636 through which the user's fingers are inserted to grip the handle assembly 620. First and second handle holes 638 and 640 are formed in the end portions 630 and 632.

The handle holes 638 and 640 are configured such that the handle assembly 620 can accommodate any of the float plate hole distances A, B, or C described above. In particular, the first handle hole 638 comprises an upper portion 642 and a lower portion 644 separated by an intermediate surface 646. The handle hole 638 is in the form of an elongate slot. The exemplary handle hole 638 similarly comprises an upper portion 648 and a lower portion 650 separated by an intermediate surface 651, but the exemplary hole 638 is circular. First and second mounting screws 652 and 654 extend through the first and second handle holes 638 and 640 and are threaded into plate holes in the float plate to which the handle assembly 620 is mounted.

The length of the slotted first handle hole 638 is such that, with the second mounting screw 654 extending through the second handle hole 640and threaded into a first plate hole, the second mounting screw 652 can extend through the first handle hole 638 and into the second plate hole of any of the float plates 60a, 60b, and 60c described above. The heads of the mounting screws 652 and 654 engage the intermediate surfaces 646 and 651 to hold the handle assembly 620 onto the float plate.

Both of exemplary handle holes 638 and 640 may be elongated; a handle assembly having two such elongate handle holes not only accommodates different float plates but provides the user with some flexibility in adjusting the balance of the hand float.

IX. Eighth Embodiment

Figure 19:
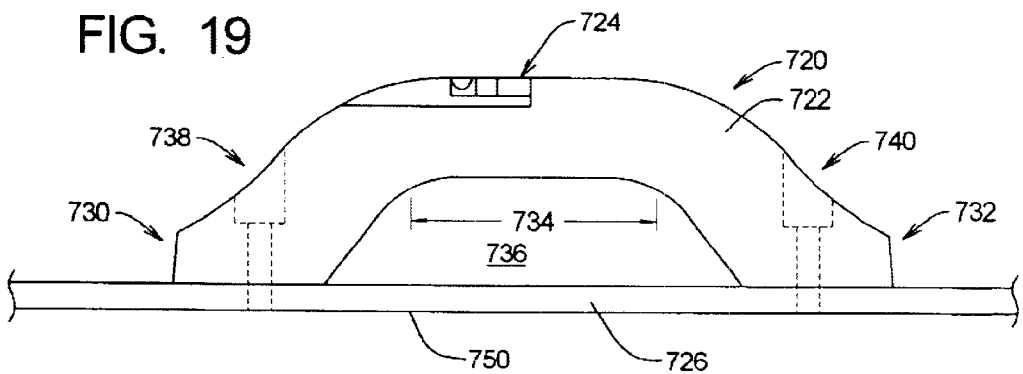
FIGS. 19 and 20 are side elevation views of a seventh embodiment of a hand float constructed in accordance with, and embodying, the principles of the present invention.
Figure 20:
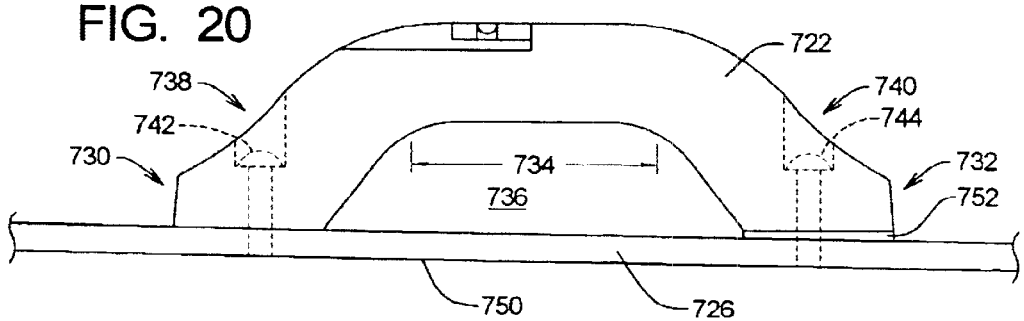

Referring now to FIGS. 19 and 20, a handle assembly 720 of a eighth embodiment of the hand float 50 will now be described. The principles of the handle assembly 720 may be applied to any of the handle assemblies 60, 120, 220, 320, 420, 520, and 620 described above and has special application to any handle assembly that does not contain means for adjusting an angle between the level axis and the working surface of the float plate.

The handle assembly 720 is similar to the handle assembly 420 described above and comprises a float handle 722 and a leveling device 724; the handle assembly 720 is shown attached to an exemplary float plate 726 that may be the same as any of the float plates 66*a–c* described above.

The float handle 722 defines first and second end portions 730 and 732 and a center portion 736. The end portions 730 and 732 extend at an angle to the center portion 734 such that the handle assembly 720 defines a notch area 736 through which the user's fingers are inserted to grip the handle assembly 720. First and second handle holes 738 and 740 are formed in the end portions 730 and 732. First and second mounting screws 742 and 744 extend through the handle holes 738 and 740 and are threaded into first and second plate holes 746 and 748 formed in the float plate 726.

In FIG. 19, the handle assembly 720 is shown attached directly to the float plate 726. However, when the hand float formed by the handle assembly 720 and the float plate 726 is placed on a level surface as shown, the leveling device 724 shows that the level axis of the leveling device 724 is not level and thus that the level axis is not parallel to a lower surface 750 of the float plate 726.

In FIG. 20, a shim member 752 is placed under the second end portion 732 of the handle assembly 720 to adjust the angle of the level axis with respect to the lower surface 752 of the float plate 726. The shim member 752 adjusts this angle such that the leveling device 724 indicates that the level axis is level and thus that the level axis is parallel to the lower surface 750 of the float plate.

X. Ninth Embodiment

Referring now to FIG. 21, a handle assembly 820 of a ninth embodiment of the hand float 50 will now be described. The principles of the handle assembly 820 are best applied to the handle assembly 420 described above but may have application to the handle assemblies 50, 120, 220, 520, 620, and 720 as well. The handle assembly 820 will be described only to the extent that it differs from the handle assembly 420, with the 400 being added to the reference characters of the handle assembly 420. The handle assembly 820 is shown attached to a float plate 826 having a lower surface 828.

The level frame 850 differs from the level frame 450 in that an adjustment hole 870 is formed in the frame 850 and a hinge projection 872 extends from the second hidden surface 866 of the frame. The hinge projection 872 is snugly received in a hinge groove 874 formed in the vertical surface 862 defining the level notch 858 in the float handle 822. This arrangement allows the first hidden surface 864 to move slightly towards and away from the horizontal surface 860 defining the notch 858 about an adjustment axis 876. The adjustment axis 876 is parallel to the working surface 828 of the float plate 826.

An adjustment screw 880 extends through the adjustment hole 870 and into a threaded cavity 882 in the float handle 822. An adjustment collar 884 held by the frame 850 allows rotation of the adjustment screw 880 about its longitudinal axis but prevents relative movement between the adjustment screw 880 and the frame 850 along its longitudinal axis. The adjustment screw 880 is, however, threaded into the adjustment cavity 882 such that axial rotation of adjustment screw 880 causes the screw 880 to move along its longitudinal axis into and out of the adjustment cavity 882.

The handle assembly 820 thus allows an angle between the level axis of the bubble level 852 and the lower surface 826 of the float plate 826 to be adjusted as necessary to make the level axis parallel to the lower surface 826.

XI. Tenth Embodiment

Referring now to FIGS. 24–29, a handle assembly 920 of a tenth embodiment of the hand float 50 will now be described. As shown in FIGS. 24 and 25, the handle assembly 920 is adapted to be connected to a float plate 922. The float plate 922 is or may be conventional and will not be described in detail herein.

As perhaps best shown in FIG. 26, the handle assembly 920 comprises a handle member 930, a level cover 932, a first attachment system 934, a second attachment system 936, and a bubble member 938. The bubble member 938 is conventional and will not be described herein beyond the extent necessary for a complete understanding of the present invention.

The bubble member 938 is mounted to the handle member 930 and is covered by the level cover 932. The first and second attachment systems 934 and 936 attach the handle member 930, and thus the bubble member 938, to the float plate 922 such that the bubble member 938 indicates when the float plate 922 is level. The level cover 932 is made of a clear material, preferably plastic, that allows the bubble member 938 to be visible to the user.

The level assembly 932 is secured to the handle member 930 at the level mount 940, and the first and second attachment systems 934 and 936 engage the attachment cavities 942 and 944 to secure the handle member 930 to the float plate 922.

With the foregoing generally understanding of the construction and operation of the handle assembly 920 in mind, the details of the exemplary handle assembly 920 will now be described.

Figure 27:
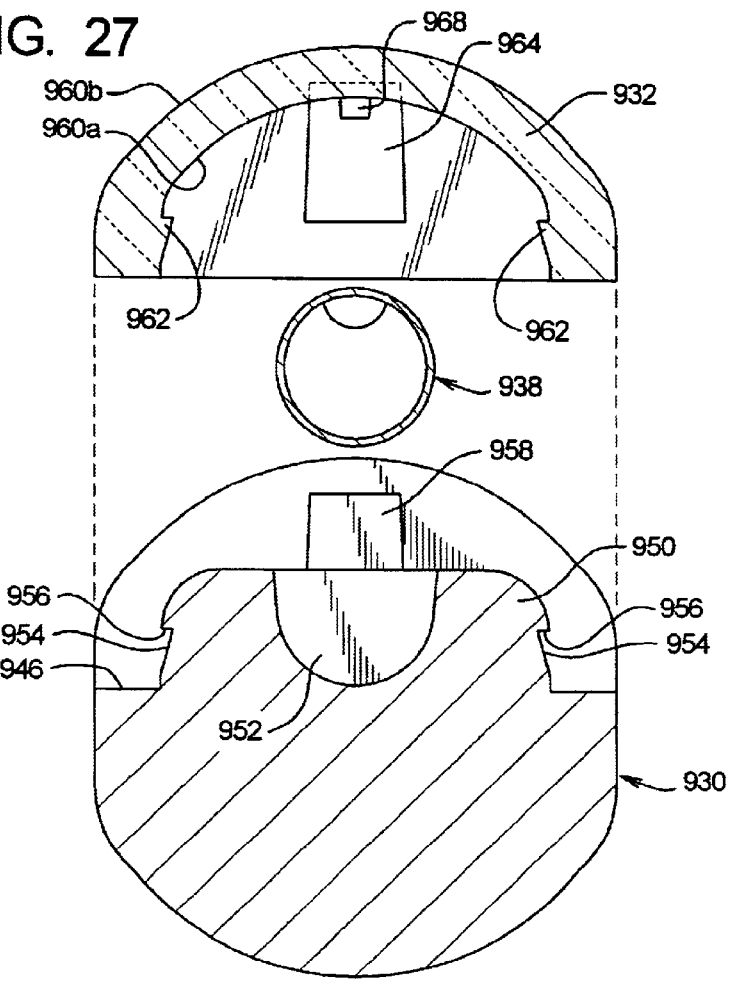
FIG. 27 is a cutaway view taken along lines 27—27 in FIG. 26.

Referring initially to FIG. 27, it can be seen that the handle member 930 defines a level mount 940 and first and second attachment cavities 942 and 944. The level mount extends from a cover surface 946 formed by a cut-out portion 948 of the handle member 930.

The level mount 940 comprises a mounting projection 950 that extends from the cover surface 946 and defines a level groove 952. The level groove 952 is sized and dimensioned to snugly receive the bubble member 938. In the exemplary handle assembly 920, the bubble member 938 simply rests in the level groove 952; in other embodiments of the present invention, the bubble member 938 may be secured within the level groove 952 by use of adhesive or by shaping the level groove 952 to form a snap fit that positively engages the bubble member 938.

The exemplary mounting projection 950 is, as shown in FIGS. 24 and 25, generally in the shape of an elongate rectangular box that extends upwards from the cover surface 946. Mounting grooves 954 are formed in the mounting projection 950; these mounting grooves 954 define mounting lips 956 that over hang the cover surface 946. An alignment projection 958 is also formed on the exemplary mounting projection 950.

The level cover 932 is adapted to engage the mounting projection 950 to secure the level cover 932 to the handle member 930. In particular, a surface of the cover 932 defines an inner portion 960a and an outer portion 960b. Mounting projections 962 extend from the inner surface portion 960a. An alignment notch 964 is also formed in the inner surface portion 960a, and an engagement portion of the inner surface portion 960a is identified by reference character 966. A spacing projection 968 extends from the inner surface portion 960a.

In use, the level cover 932 is displaced towards the mounting portion 950 until the cover 932 engages the cover surface 946 formed on the handle member 930. The mounting projections 962 are sized, spaced, and dimensioned such that these projections 962 enter the mounting grooves 954 when the cover 932 engages the cover surface 946. The projections 962 are arranged under the mounting lips 956 to positively lock the cover 932 onto the handle member 930. In addition, the alignment notch 964 in the cover 932 receives the alignment projection 958 to ensure that the cover 932 is properly oriented relative to the handle member 930.

Figure 28:
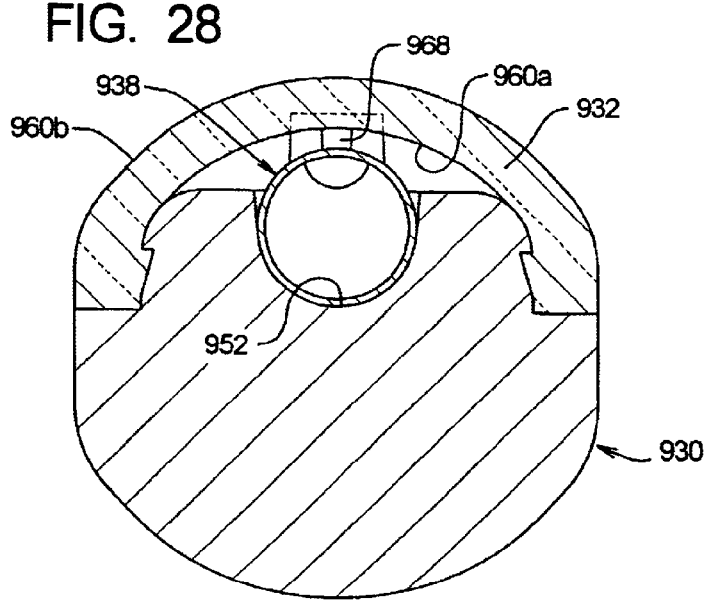
FIG. 28 is a cutaway view taken along lines 28—28 in FIG. 24.
Figure 29:
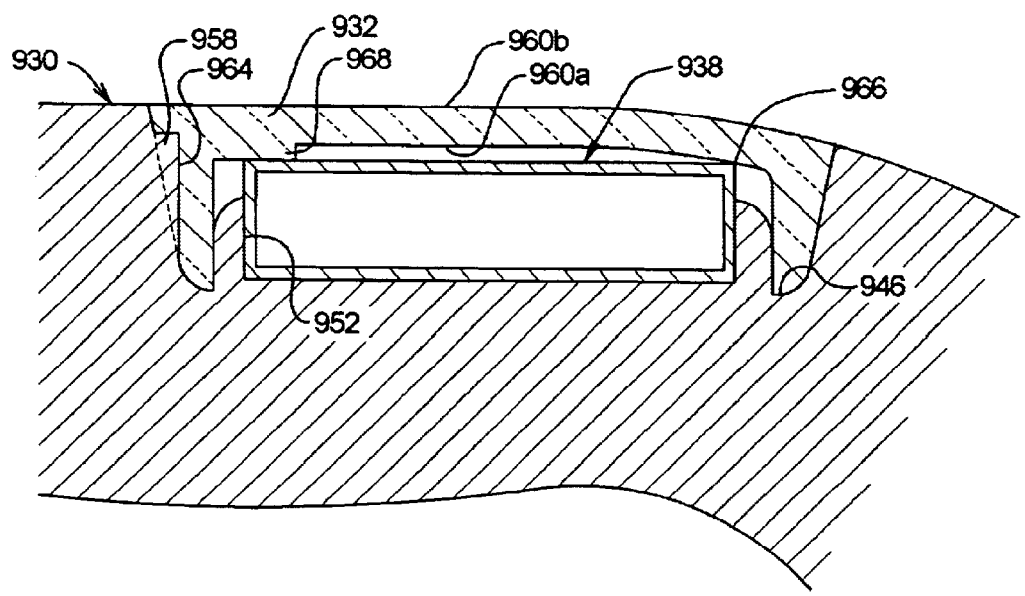
FIG. 29 is a close up cutaway view of the handle assembly as depicted in FIGS. 24 and 28.

As perhaps best shown in FIGS. 28 and 29, when the level cover 932 is mounted on the handle member 930 as described, the engagement portion 966 of the inner surface 960a and the spacing projection 968 both engage the bubble member 938 to hold the bubble member 938 in the level groove 952.

Also as shown in FIGS. 28 and 29, when the level member 932 is mounted on the handle member 930, the level cover 932 is shaped such that the outer surface portion 960b thereof conforms to and continues a grasping surface 930a of the handle member 930. The use of the bubble member 938 thus does not interfere in any way with the grasping of the handle assembly 920 and, as described above, yields significant benefits when manipulating the float plate 922.

Referring now to FIG. 26, it can be seen that the exemplary first and second attachment systems 934 and 936 are the same, and only the first attachment system 934 will be described herein with the understanding that this description also applies to the second attachment system 934.

The attachment system 934 comprises a screw 970, a washer 972, a screw cover 974, and the attachment cavity 942. The screw 970 extends through the washer 972 and the first attachment cavity 942. The attachment cavity 942 extends completely through the handle member 930 such that the screw 970 extends into and engages a threaded hole (not shown) in the float plate 922. Rotating the screw 970 in a first direction into the threaded hole in the float plate 922 causes the screw 970 to engage the handle member 930 through the washer 972 to secure the handle assembly 920 to the float plate 922.

The attachment cavity 944 comprises, in sequence, a first portion 980, a second portion 982, and a third portion 984. A support ledge 986 is formed at the juncture of the first and second portions 980 and 982, while a plate surface 988 is formed on the handle member 30 adjacent to the third portion 984 of the cavity 944. The washer 972 engages the support ledge 986 to hold the plate surface 988 firmly against the float plate 922.

The screw cover 974 defines an exposed surface 990, and cavity surface 992, and a support surface 994. The cavity surface 992 of the screw cover 974 is sized and dimensioned to fit snugly within the first portion 980 of the attachment cavity 942. The support surface 994 of the screw cover 974 engages the support ledge 986 when the screw cover 974 is properly oriented relative to the handle member 930. In this proper orientation as shown in FIGS. 24 and 28, the exemplary exposed surface 990 conforms to and continues the grasping surface 930a of the handle member 930. The screw covers 974 thus do not interfere with grasping of the handle member 930 or use of the float plate 922.

In addition, the smooth transitions at the junctures of the handle member 930 and the level cover 932 and the screw covers 974 prevent concrete from collecting in crevices or cavities in the handle assembly 920, thereby facilitating clean up of the handle assembly 920.

As perhaps best shown in FIGS. 25 and 26, both of the attachment cavities 934 and 936 are elongated. As discussed above with reference to the fifth embodiment identified by reference character 620, the use of two elongated cavities 934 and 936 allows the handle assembly 920 to accommodate float plates 922 having differing hole configurations. These elongate cavities 934 and 936 can be spaced from each other to allow slight forward and rearward adjustment of the handle member 930 relative to the plate 922.

From the foregoing, it should be apparent that the present invention may be embodied in forms other than those described above. For example, the relative positions of the mounting grooves 954 and the mounting projections 962 may be switched or the grooves 954 and 962 can be relocated and still implement the principles of the present invention.

The scope of the present invention should thus be determined by the following claims and not the foregoing detailed description.

We claim:

1. A handle assembly for a hand float having a float member defining a substantially planer lower surface and having a plurality of float holes formed in the upper surface, the handle assembly comprising:

a handle member defining a grasping surface and a mounting portion and having first and second attachment cavities formed therein;

first and second screw members that extend through the first and second attachment cavities and into one of the float holes to fix the handle member to the float member;

a bubble member supported by the mounting portion of the handle member such that the bubble member indicates whether lower surface of the float member is horizontal; and a clear level cover having an outer surface, where the level cover engages the handle member to cover the bubble member, at least one mounting groove is formed on one of the handle member and the level cover, at least one mounting protection is formed on the other of the handle member and the level cover, and the mounting groove receives the mounting projection to secure the level cover relative to the handle member; whereby the user of the hand float grasps the handle member to work the concrete slab before the slab is cured;

the user of the hand float views the leveling device through the level cover while working the concrete slab to ensure that the portion of the slab being worked is substantially flat and substantially at the desired level; and the outer surface of the level cover is sized and dimensioned to form a smooth and continuous transition between the handle surface and the outer surface of the level cover.

2. A handle assembly as recited in claim 1, in which the attachment cavities are elongated.

3. A handle assembly as recited in claim 1, in which:
   the at least one mounting groove is formed on one of the mounting portion of the handle member and the level cover; and
   the at least one mounting projection is formed on the other of the mounting portion of the handle member and the level cover.

4. A handle assembly as recited in claim 1, in which the level cover engages the bubble member to hold the bubble member against the mounting portion of the handle member.

5. A handle assembly as recited in claim 4, in which a spacing projection extends from an inner surface of the level cover to engage the bubble member.

6. A handle assembly as recited in claim 4, in which an engagement portion of an inner surface of the level cover engages the bubble member.

7. A handle assembly as recited in claim 5, in which an engagement portion of the inner surface of the level cover engages the bubble member.

8. A handle assembly as recited in claim 1, in which a level groove is formed in the mounting portion, where the level groove is sized and dimensioned to snugly receive the bubble member.

9. A handle assembly as recited in claim 8, in which the level cover engages the bubble member to hold the bubble member within the level groove.

10. A handle assembly as recited in claim 1, further comprising screw covers that engage the attachment cavities to cover the screw members.

11. A handle assembly as recited in claim 10, in which the screw covers each define an exposed surface that is sized and dimensioned to form a smooth and continuous transition between the handle surface and the screw covers.

12. A handle assembly for a hand float having a float member defining a substantially planer lower surface and having a plurality of float holes formed in the upper surface, the handle assembly comprising:
   a handle member defining a grasping surface and a mounting portion and having first and second elongate attachment cavities formed therein;
   first and second screw members that extend through the first and second attachment cavities and into one of the float holes to fix the handle member to the float member;
   a bubble member supported by the mounting portion of the handle member such that the bubble member indicates whether lower surface of the float member is horizontal; and
   a clear level cover having an outer surface, where the level cover engages the mounting portion of the handle member to cover the bubble member, and
   the bubble member to hold the bubble member against the mounting portion of the handle member; whereby
   the user of the hand float grasps the handle member to work the concrete slab before the slab is cured;
   the user of the hand float views the leveling device through the level cover while working the concrete slab to ensure that the portion of the slab being worked is substantially flat and substantially at the desired level; and
   the outer surface of the level cover is sized and dimensioned to form a smooth and continuous transition between the handle surface and the outer surface of the level cover.

13. A handle assembly as recited in claim 12, in which:
   at least one mounting groove is formed on one of the handle member and the level cover; and
   at least one mounting projection is formed on the other of the handle member and the level cover; wherein
      the mounting groove receives the mounting projection to secure the level cover relative to the handle member.

14. A handle assembly as recited in claim 13, in which:
   the at least one mounting groove is formed on one of the mounting portion of the handle member and the level cover; and
   the at least one mounting projection is formed on the other of the mounting portion of the handle member and the level cover.

15. A handle assembly as recited in claim 12, in which a level groove is formed in the mounting portion, where the level groove is sized and dimensioned to snugly receive the bubble member.

16. A handle assembly as recited in claim 12, further comprising screw covers that engage the attachment cavities to cover the screw members, where the screw covers each define an exposed surface that is sized and dimensioned to form a smooth and continuous transition between the handle surface and the screw covers.

17. A handle assembly as recited in claim 12, in which a projection extends from an inner surface of the level cover to engage the bubble member.

18. A handle assembly as recited in claim 15, in which an engagement portion of the inner surface of the level cover engages the bubble member.

19. A handle assembly as recited in claim 12, in which an engagement portion of an inner surface of the level cover engages the bubble member.

20. A handle assembly for a hand float having a float member defining a substantially planer lower surface and having a plurality of float holes formed in the upper surface, the handle assembly comprising:
   a handle member defining a grasping surface and a mounting portion and having first and second attachment cavities formed therein;
   first and second screw members that extend through the first and second attachment cavities and into one of the float holes to fix the handle member to the float member;
   a bubble member supported by the mounting portion of the handle member such that the bubble member indicates whether lower surface of the float member is horizontal, where the level cover engages the bubble member to hold the bubble member against the mounting portion of the handle member; and
   a clear level cover having an outer surface, where the level cover engages the handle member to cover the bubble member; whereby
   the user of the hand float grasps the handle member to work the concrete slab before the slab is cured;
   the user of the hand float views the leveling device through the level cover while working the concrete slab to ensure that the portion of the slab being worked is substantially flat and substantially at the desired level; and
   the outer surface of the level cover is sized and dimensioned to form a smooth and continuous transition between the handle surface and the outer surface of the level cover.

21. A handle assembly as recited in claim 20, in which a spacing projection extends from an inner surface of the level cover to engage the bubble member.

22. A handle assembly as recited in claim 21, in which an engagement portion of the inner surface of the level cover engages the bubble member.

23. A handle assembly as recited in claim 20, in which an engagement portion of an inner surface of the level cover engages the bubble member.

24. A handle assembly for a hand float having a float member defining a substantially planer lower surface and having a plurality of float holes formed in the upper surface, the handle assembly comprising:

- a handle member defining a grasping surface and a mounting portion and having first and second attachment cavities formed therein, where a level groove is formed in the mounting portion;
- first and second screw members that extend through the first and second attachment cavities and into one of the float holes to fix the handle member to the float member;
- a bubble member supported by the mounting portion of the handle member such that the bubble member indicates whether lower surface of the float member is horizontal, where the level groove is sized and dimensioned to snugly receive the bubble member; and
- a clear level cover having an outer surface, where the level cover engages the handle member to cover the bubble member; whereby
- the user of the hand float grasps the handle member to work the concrete slab before the slab is cured;
- the user of the hand float views the leveling device through the level cover while working the concrete slab to ensure that the portion of the slab being worked is substantially flat and substantially at the desired level; and
- the outer surface of the level cover is sized and dimensioned to form a smooth and continuous transition between the handle surface and the outer surface of the level cover.

25. A handle assembly as recited in claim 24, in which the level cover engages the bubble member to hold the bubble member within the level groove.

26. A handle assembly for a hand float having a float member defining a substantially planer lower surface and having a plurality of float holes formed in the upper surface, the handle assembly comprising:

- a handle member defining a grasping surface and a mounting portion and having first and second attachment cavities formed therein;
- first and second screw members that extend through the first and second attachment cavities and into one of the float holes to fix the handle member to the float member;
- a bubble member supported by the mounting portion of the handle member such that the bubble member indicates whether lower surface of the float member is horizontal;
- a clear level cover having an outer surface, where the level cover engages the handle member to cover the bubble member; and
- screw covers that engage the attachment cavities to cover the screw members; whereby
- the user of the hand float grasps the handle member to work the concrete slab before the slab is cured;
- the user of the hand float views the leveling device through the level cover while working the concrete slab to ensure that the portion of the slab being worked is substantially flat and substantially at the desired level; and
- the outer surface of the level cover is sized and dimensioned to form a smooth and continuous transition between the handle surface and the outer surface of the level cover.

27. A handle assembly as recited in claim 26, in which the screw covers each define an exposed surface that is sized and dimensioned to form a smooth and continuous transition between the handle surface and the screw covers.

* * * * *